(12) United States Patent
Goredema et al.

(10) Patent No.: US 7,665,835 B2
(45) Date of Patent: Feb. 23, 2010

(54) PHASE CHANGE INKS AND METHODS FOR MAKING SAME

(75) Inventors: Adela Goredema, Mississauga (CA); Christine E. Bedford, Burlington (CA); Marcel P. Breton, Mississauga (CA); Christopher Wagner, Toronto (CA)

(73) Assignee: Xerox Corporation, Norwalk, CT (US)

( * ) Notice: Subject to any disclaimer, the term of this patent is extended or adjusted under 35 U.S.C. 154(b) by 741 days.

(21) Appl. No.: 11/291,592

(22) Filed: Nov. 30, 2005

(65) Prior Publication Data

US 2007/0120919 A1  May 31, 2007

(51) Int. Cl.
*G01D 11/00* (2006.01)
*C09D 11/12* (2006.01)

(52) U.S. Cl. .................. 347/99; 106/31.29; 106/31.43; 106/31.61; 106/31.75

(58) Field of Classification Search ........................ None
See application file for complete search history.

(56) References Cited

U.S. PATENT DOCUMENTS

| 4,889,560 A | 12/1989 | Jaeger et al. |
| 4,889,761 A | 12/1989 | Titterington et al. |
| 5,221,335 A | 6/1993 | Williams et al. |
| 5,372,852 A | 12/1994 | Titterington et al. |
| 5,496,879 A | 3/1996 | Griebel et al. |
| 5,621,022 A | 4/1997 | Jaeger et al. |
| 5,779,779 A * | 7/1998 | Jolly ........................ 106/31.29 |
| 5,783,657 A | 7/1998 | Pavlin et al. |
| 5,998,570 A | 12/1999 | Pavlin et al. |
| 6,106,602 A * | 8/2000 | Ouchi et al. ............. 106/31.61 |
| 6,111,055 A | 8/2000 | Berger et al. |
| 2004/0176500 A1 * | 9/2004 | Titterington et al. ........ 523/160 |
| 2004/0261656 A1 * | 12/2004 | Wu et al. .................. 106/31.29 |

FOREIGN PATENT DOCUMENTS

| DE | 4205636AL | 2/1992 |
| DE | 4205713AL | 2/1992 |
| WO | WO98/17705 | 4/1998 |

OTHER PUBLICATIONS

U.S. Appl. No. 11/004,332.
U.S. Appl. No. 11/004,333.

* cited by examiner

*Primary Examiner*—David Wu
*Assistant Examiner*—Vu Nguyen
(74) *Attorney, Agent, or Firm*—Marger Johnson & McCollom, P.C.

(57) ABSTRACT

Disclosed is a phase change ink composition and a method for forming the ink composition. The phase change ink composition comprises (1) an ink carrier comprising (A) a first component which comprises a monoester wax or blend of monoesters having at least one alkyl group comprising at least 10 carbon atoms, and (B) a second component which comprises a polyalkylene wax, and (2) a urea gellant and (3) a colorant.

19 Claims, No Drawings

PHASE CHANGE INKS AND METHODS FOR MAKING SAME

BACKGROUND

Disclosed herein are phase change inks and methods for making same. In one embodiment, disclosed herein are phase change inks which are low energy. In another embodiment, the phase change inks can be used in direct and indirect printing processes. An embodiment is directed to a phase change ink composition comprising (1) an ink carrier comprising (A) a first component which comprises a monoester wax or blend of monoesters having at least one alkyl group comprising at least 10 carbon atoms, and (B) a second component which comprises a polyalkylene wax, (2) a urea gellant, and (3) a colorant. Another embodiment is directed to a method which comprises (a) incorporating into an ink jet printing apparatus a low energy phase change ink composition comprising (A), (B), and (2) above, and (3) a colorant; (b) melting the ink; (c) causing droplets of the melted ink to be ejected in an image wise pattern onto an intermediate transfer member; and (d) transferring the ink in the image wise pattern from the intermediate transfer member to a final recording substrate.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (commercially available from C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labeling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known and are described in U.S. patent application Ser. No. 10/881,047, the disclosure of which is incorporated in its entirety herein by reference.

U.S. Pat. No. 5,783,657, U.S. Pat. No. 5,998,570 and WO 98/17704, (Pavlin et al), the disclosures each of which are totally incorporated herein by reference, disclose a low molecular weight, ester-terminated polyamide that may be blended with a liquid hydrocarbon to form a transparent composition having gel consistency. The ester-terminated polyamide is prepared by reacting "x" equivalents of dicarboxylic acid wherein at least 50 percent of those equivalents are from polymerized fatty acid, "y" equivalents of diamine such as ethylene diamine, and "z" equivalents of monoalcohol having at least 4 carbon atoms. The stoichiometry of the reaction mixture is such that $0.9 \leq \{x/(y+z)\} \leq 1.1$ and $0. \leq \{z/(y+z)\} \leq 0.7$. The reactants are heated until they reach reaction equilibrium.

U.S. Pat. No. 6,111,055 (Berger, et al), the disclosure of which is totally incorporated herein by reference, discloses an ester terminated dimer acid-based polyamide which is blended with a solvent to form a gel. The solvent may be flammable, and a wick may be added to the resulting gel to form a candle. The said ester terminated dimer acid-based polyamide is prepared by thermal condensation of a diacid, a diamine and a monoalcohol.

A need remains for improved phase change inks, and more specifically, low energy solid inks which permit phase change ink jet printers to perform at more moderate operating conditions than with conventional phase change inks. For example, a need exists for phase change inks which can be jetted at temperatures lower than conventional jetting temperatures as described below. Also, there is a need for phase change inks having improved transfuse latitude and low stand-by temperature. Also, there is a need for phase change inks having a lower melt viscosity at this lower temperature range. In addition, a need remains for phase change inks which enable more control over the molecular weight of the ink carrier and of certain components of the ink carrier. A need also remains for phase change inks that print successfully on paper and transparency stock. A need also remains for phase change inks that can allow high frequency printing at low temperature making it possible to print with smaller drops, without significantly affecting the print speed. Smaller drops in turn can enable higher resolution printing and thinner ink layers. Thinner ink layers can have improved scratch resistance. A need also remains for phase change inks that can have improved drop spreading and drop coalescence characteristics when printed on an intermediate substrate, and prior to transfer to paper. Such improvements translate into improved overall print quality on plain paper and coated paper. Furthermore, there is a need for phase change inks that generate prints with good performance in automatic document feeders. There is also a need for phase change inks that can exhibit at least some of the above advantages with reduced energy requirements while printing.

SUMMARY

Many phase change inks currently being used in solid ink jet piezoelectric printers employ high jetting temperatures (about 140 degrees C.) and long warm up times. The images currently produced by these inks can also, in many instances, exhibit poor scratch resistance and image permanence.

Disclosed herein is a phase change ink composition comprising (1) an ink carrier comprising (A) a first component which comprises a monoester wax or blend of monoesters having at least one alkyl group comprising at least 10 carbon atoms, and (B) a second component which comprises a polyalkylene wax, (2) a urea gelling agent, and (3) a colorant.

A process is also provided which comprises (a) incorporating into an ink jet printing apparatus a phase change ink composition comprising (1) an ink carrier comprising (A) and (B) above; (2) a urea gellant and (3) a colorant; (b) melting the ink; and (c) causing droplets of the melted ink to be ejected in an image wise pattern onto a substrate.

DETAILED DESCRIPTION

The ink compositions disclosed herein comprise a phase change ink carrier comprising (1) an ink carrier comprising (A) a first component which comprises a monoester wax or blend of monoesters having at least one alkyl group comprising at least 10 carbon atoms, and (B) a second component which comprises a polyalkylene wax, (2) a urea gellant and (3) a colorant. The inks can demonstrate excellent viscoelastic behavior, in one embodiment under low energy operating conditions, and can have improved jetting properties at temperatures as low as 100 degrees C., compared to conventional inks which are jetted at substantially higher temperatures, while maintaining equivalent robustness.

The first component in the ink carrier disclosed herein is a monoester wax. In one embodiment, the monoester wax is a low melting monoester wax. In one embodiment the melting point of the monoester wax is at least about 60° C., in another embodiment at least about 65° C., and in a further embodiment about 70° C., and in one embodiment equal to or less than about 90° C., in another embodiment equal to or less than about 85° C., and in a further embodiment equal to or less than about 80° C., although the melting point can be outside these ranges. This use of a low melting monoester wax as a solid ink vehicle can facilitate overcoming the problems associated with high energy phase change inks. In an embodiment of this disclosure it can have a low viscosity at a target jetting temperature (less than about 110° C.) and high viscosity at room temperature. Accordingly, low energy phase change ink with a low jetting temperature (less than or equal to about 110° C.) and low standby temperature (less than or equal to about 85° C.) can be formulated. In another embodiment, shorter warm up from stand-by temperature can be achieved. In one embodiment the warm up time is from about 0 minutes, in another embodiment from about 0.25 minutes, and in a further embodiment from about 0.5 minutes, and in one embodiment equal to or less than about 2 minutes, in another embodiment equal to or less than about 1.75 minutes, and in a further embodiment equal to or less than about 1.5 minutes, although the warm up time can be outside these ranges. These inks can enable the design of solid ink printers that can have a substantially reduced warm up time, in a further embodiment, the ink can be ejected at temperatures usually associated with the standby temperatures of conventional solid ink printers.

The viscosity of the monoester wax at the jetting temperature in one embodiment comprises equal to or less than about 10 cps, in another embodiment equal to or less than about 8 cps, and in yet another embodiment equal to or less than about 5 cps, although the viscosity of the monoester wax at the jetting temperature can be outside of these ranges.

The viscosity at the jetting temperature of the phase change ink in one embodiment is equal to or less than about 20 cps, in another embodiment equal to or less than about 15 cps, and in yet another embodiment equal to or less than about 10 cps, although the viscosity of the phase change ink at the jetting temperature can be outside of these ranges.

Examples of suitable monoester waxes include (but are not limited to) those of the formula

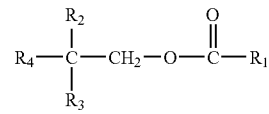

wherein $R_1$ and $R_2$ each, independently of the other, can be an alkyl group, including linear, branched, saturated, unsaturated, cyclic, substituted, and unsubstituted alkyl groups, and wherein hetero atoms, such as oxygen, nitrogen, sulfur, silicon, phosphorus, boron, either may or may not be present in the alkyl group, in one embodiment with at least 1 carbon atom, in another embodiment with at least about 4 carbon atoms, and in yet another embodiment with at least about 10 carbon atoms, and in one embodiment with equal to or less than about 100 carbon atoms, in another embodiment with equal to or less than about 60 carbon atoms, and in yet another embodiment with equal to or less than about 50 carbon atoms, although the number of carbon atoms can be outside of these ranges, including (but not limited to) (1) linear saturated unsubstituted aliphatic groups containing no hetero atoms, (2) branched saturated unsubstituted aliphatic groups containing no hetero atoms, (3) cyclic saturated unsubstituted aliphatic groups containing no hetero atoms, (4) aliphatic groups containing both cyclic and acyclic portions, said aliphatic groups being saturated, unsubstituted, and containing no hetero atoms, (5) linear ethylenically unsaturated unsubstituted aliphatic groups containing no hetero atoms, (6) branched ethylenically unsaturated unsubstituted aliphatic groups containing no hetero atoms, (7) cyclic ethylenically unsaturated unsubstituted aliphatic groups containing no hetero atoms, (8) aliphatic groups containing both cyclic and acyclic portions, said aliphatic groups being ethylenically unsaturated, unsubstituted, and containing no hetero atoms, (9) linear saturated substituted aliphatic groups containing no hetero atoms, (10) branched saturated substituted aliphatic groups containing no hetero atoms, (11) cyclic saturated substituted aliphatic groups containing no hetero atoms, (12) aliphatic groups containing both cyclic and acyclic portions, said aliphatic groups being saturated, substituted, and containing no hetero atoms, (13) linear ethylenically unsaturated substituted aliphatic groups containing no hetero atoms, (14) branched ethylenically unsaturated substituted aliphatic groups containing no hetero atoms, (15) cyclic ethylenically unsaturated substituted aliphatic groups containing no hetero atoms, (16) aliphatic groups containing both cyclic and acyclic portions, said aliphatic groups being ethylenically unsaturated, substituted, and contain no hetero atoms, (17) linear saturated unsubstituted aliphatic groups containing hetero atoms, (18) branched saturated unsubstituted aliphatic groups containing hetero atoms, (19) cyclic saturated unsubstituted aliphatic groups containing hetero atoms, (20) aliphatic groups containing both cyclic and acyclic portions, said aliphatic groups being saturated, unsubstituted, and containing hetero atoms, (21) linear ethylenically unsaturated unsubstituted aliphatic groups containing hetero atoms, (22) branched ethylenically unsaturated unsubstituted aliphatic groups containing hetero atoms, (23) cyclic ethylenically unsaturated unsubstituted aliphatic groups containing hetero atoms, (24) aliphatic groups containing both cyclic and acyclic portions, said aliphatic groups being ethylenically unsaturated, unsubstituted, and containing hetero atoms, (25) linear saturated substituted aliphatic groups containing hetero atoms, (26) branched saturated substituted aliphatic groups containing hetero atoms, (27) cyclic saturated substituted aliphatic groups containing hetero atoms, (28) aliphatic groups containing both cyclic and acyclic portions, said aliphatic groups being saturated, substituted, and containing hetero atoms, (29) linear ethylenically unsaturated substituted aliphatic groups containing hetero atoms, (30) branched ethylenically unsaturated substituted aliphatic groups containing hetero atoms, (31) cyclic ethylenically unsaturated substituted aliphatic groups containing hetero atoms, and (32) aliphatic groups containing both cyclic and acyclic portions, said aliphatic groups being ethylenically unsaturated, substituted, and containing hetero atoms, (ii) an aryl group (including substituted and unsubstituted aryl groups, and wherein hetero atoms, such as oxygen, nitrogen, sulfur, silicon, phosphorus, boron, and the like either may or may not be present in the aryl group), in one embodiment with at least about 5 carbon atoms, and in another embodiment with at least about 6 carbon atoms, and in one embodiment with no more than about 18 carbon atoms, in another embodiment with no more than about 12 carbon atoms, and in yet another embodiment with no more than about 6 carbon atoms, although the number of carbon atoms can be outside of these ranges, (iii) an arylalkyl group (including substituted and unsubstituted arylalkyl groups, and wherein hetero atoms, such as oxygen, nitrogen, sulfur, silicon, phosphorus, boron, and the like either may or may not be present in either the aryl or the alkyl portion of the arylalkyl group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as benzyl or the like, or (iv) an alkylaryl group (including substituted and unsubstituted alkylaryl groups, and wherein hetero atoms, such as oxygen, nitrogen, sulfur, silicon, phosphorus, boron, and the like either may or may not be present in either the aryl or the alkyl portion of the alkylaryl group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as tolyl or the like, $R_3$ is a hydrogen atom or an alkyl group (including linear, branched, saturated, unsaturated, substituted, and unsubstituted alkyl groups), in one embodiment with at least 1 carbon atom, in another embodiment with at least about 4 carbon atoms, and in yet another embodiment with at least about 10 carbon atoms, and in one embodiment with no more than about 100 carbon atoms, in another embodiment with no more than about 60 carbon atoms, and in yet another embodiment with no more than about 50 carbon atoms, although the number of carbon atoms can be outside of these ranges, $R_4$ is a hydrogen atom, a hydroxyl group, or an alkyl group (including linear, branched, saturated, unsaturated, substituted, and unsubstituted alkyl groups), in one embodiment with at least 1 carbon atom, in another embodiment with at least about 4 carbon atoms, and in yet another embodiment with at least about 10 carbon atoms, and in one embodiment with no more than about 100 carbon atoms, in another embodiment with no more than about 60 carbon atoms, and in yet another embodiment with no more than about 50 carbon atoms, although the number of carbon atoms can be outside of these ranges, wherein the substituents on the substituted alkyl, aryl, arylalkyl, and alkylaryl groups in $R_1$, $R_2$, $R_3$ and $R_4$ can be (but are not limited to) halogen atoms, including fluorine, chlorine, bromine, and iodine atoms, ether groups, sulfide groups, sulfoxide groups, phosphine groups, nitrile groups, mercapto groups, nitro groups, nitroso groups, sulfone groups, hydroxyl groups, mixtures thereof, and the like, wherein two or more substituents can be joined together to form a ring.

Specific examples of the monoesters include Kester wax 42 where $R_1$=$CH_3(CH_2)_{20}$, $R_2$=$CH_3(CH_2)_{14}$, $R_3$=$CH_3(CH_2)_{15}$ and $R_4$ is H, Kester wax 60 where $R_1$=$CH_3(CH_2)_{24}$, $R_2$=$CH_3(CH_2)_{16}$, $R_3$=$CH_3(CH_2)_{17}$ and $R_4$ is H, Kester wax K-72 where $R_1$=$CH_3(CH_2)_{20}$, $R_2$=$CH_3(CH_2)_{20}$, $R_3$ and $R_4$ are both H, K 82P where $R_1$=$CH_3(CH_2)_{17}$, $R_2$=$CH_3(CH_2)_{16}$, $R_3$= an alkyl having 18 to 38 carbon atoms and $R_4$=OH. All Kester waxes are commercially available from Koster Keunun.

The rheology profile of Kester wax K-72 (behenyl behenate) can meet the major characteristics needed for a low energy ink vehicle. It has a low melting point (69-74° C.), a very low viscosity at 90° C., which indicates that it can be jetted at the target jetting temperature (105° C.). The viscosity at 100° C. is only 6.5 cps for behenyl behenate. This can provide a buffer for adding other higher viscosity ink components to the ink carrier composition. Thus, the net effect is that the subject low energy ink can meet the requisite jetting viscosity of a low energy ink.

The above described monoester wax can exhibit a relatively low viscosity. These lower molecular weight monoester waxes can facilitate lower jetting temperatures. These monoester waxes can have a viscosity in one embodiment equal to or less than about 10 cps, in another embodiment equal to or less than about 8 cps, and in yet another embodiment equal to or less than 5 cps, although the viscosity can be outside of these ranges, at a temperature in one embodiment of at least about 100° C., in another embodiment of at least about 120° C., and in yet another embodiment of at least about 140° C., although the temperature can be outside of these ranges.

A problem with many current low energy solid inks is that they can suffer from poor robustness. In an embodiment, robustness can be increased by adding a gellant to the vehicle. Gels can be created through the initial assembly of the gellant molecules into fibrous nanostructure which then further form into a three dimensional lattice, trapping the solvents within the voids of the network. Gels can be formed by small organic molecules in organic solvents and are often referred to physical gels. In these systems, the three dimensional network can be held together by non-covalent bonds such as hydrogen bonding and Van Der Waals interactions. In one embodiment, the molten vehicle can be trapped in these three dimensional networks, giving a more robust ink upon solidification.

A urea gellant can also be added to the vehicle to make the ink more robust and assist in controlling transfuse properties. The gellant can also facilitate the control of drop spreading on the intermediate substrate when the inks are used in an indirect printing process, providing for improved image uniformity and dot to dot coalescence on the intermediate substrate prior to transfer. These improvements in turn can result in increase overall print quality. The gellant can enable a thermally-controlled and reversible viscoelastic gel phase change of the molten ink.

In a further embodiment, adding a gellant to the ink can change the rheological profile of the ink and form a second viscosity plateau at temperatures above the ink crystallization temperature. This can be described as the gel state. The gel state can have a gel point. The gel point can in one embodiment be at a temperature equal to or less than about 100° C., in another embodiment equal to or less than about 95° C., and in a further embodiment equal to or less than about 90° C., although the temperature can be outside of these ranges. In still a further embodiment, the gel point is at a temperature above the melting point of the phase change ink carrier.

Upon cooling, gelation can occur before crystallization. The crystallization temperature in one embodiment is equal to or less than about 95° C., in another embodiment equal to or less than about 90° C., and in a further embodiment equal to or less than about 85° C., although the temperature can be outside of these ranges.

In an embodiment of this disclosure the gellants can exhibit a lower viscosity. These lower molecular weight gelling agents can be employed herein because of the speed at which they form the gel state, through hydrogen bonds, thereby providing for rapid increase in viscosity upon cooling to produce an image either on an intermediate substrate or directly to paper. Rapid transition from a liquid state to a gel state helps control ink penetration in direct paper printing for improved adhesion while substantially resisting show through. These gellants can have a viscosity in one embodiment equal to or less than about $1 \times 10^6$ cps, in another embodiment equal to or less than about 400 cps, and in yet another embodiment equal to or less than about 20 cps, although the viscosity can be outside of these ranges. These viscosities can be achieved at a temperature of from about 100° C. to equal to or less than about 150° C., although the temperature can be outside of this range.

A second component can comprise a urea gellant. A urea gellant can be employed because it can form reversible hydrogen bonds, resulting in the formation of oligomers and oligomer networks held together by non-covalent hydrogen bonds instead of covalent bonds. The polymer-like materials thus formed can behave like covalently-bonded polymers to enhance image permanence. The gellant molecules can be self-assembled into three-dimensional fibrous networks by intermolecular hydrogen bonding and van der Waals interactions. The molten ink is expected to get trapped into these gel networks and form a semi-solid or a gel. In addition, the gelled inks exhibit visco-elastic Theological characteristics that are different from those of conventional hot melt or phase change inks in that they show an elastic behavior in a temperature region where the ink is supposed to be in the liquid state. This behavior is evidenced by the crossover of G' (storage modulus) and G" (loss modulus), with G' being higher than G", indicating that the material is elastic. The elasticity of the material can also be expressed using tan-delta, which is defined as the ratio of G" to G', or G"/G'. A material which has a tan-delta of less than one is elastic, whereas a non-elastic material will not have a tan-delta of less than one above its melting point. The urea gellants, when present in phase change inks, can enable an intermediate gel phase wherein the gel phase transition entails a tan-delta of in one embodiment equal to or less than about 5, in another embodiment equal to or less than about 2, and in yet another embodiment equal to or less than 0.5, although the tan-delta can be outside of these ranges. This elasticity can further enhance the robustness of images generated with the inks containing the urea compounds. The urea gellants can also enable desirably narrow gel phase transitions in the inks, in one embodiment gel phase transitions from about 0.1 to 40° C. wide, in another embodiment gel phase transitions from about 0.2 to 20° C. wide, and in yet another embodiment gel phase transitions from about 0.3 to 15° C. wide, although the gel phase transitions can be outside of these ranges.

In one embodiment, mono-ureas are the urea gellants because they can have low melting points which can result in lower gel temperatures to enable jetting at a lower temperature. This mono-urea gellant, in a further embodiment, can have the following structural formula

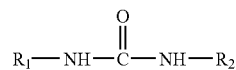

wherein $R_1$ and $R_2$ is each, independently of the other, (i) an alkyl group, including linear, branched, saturated, unsaturated, cyclic, substituted, and unsubstituted alkyl groups, and wherein hetero atoms, such as oxygen, nitrogen, sulfur, silicon, phosphorus, boron, and the like either may or may not be present in the alkyl group, in one embodiment with at least 1 carbon atom, in another embodiment with at least about 4 carbon atoms, and in yet another embodiment with at least about 10 carbon atoms, and in one embodiment equal to or less than about 100 carbon atoms, in another embodiment equal to or less than about 60 carbon atoms, and in yet another embodiment equal to or less than about 30 carbon atoms, although the number of carbon atoms can be outside of these ranges, and in yet a further embodiment including (1) linear saturated unsubstituted aliphatic groups containing no hetero atoms, (2) branched saturated unsubstituted aliphatic groups containing no hetero atoms, (3) cyclic saturated unsubstituted aliphatic groups containing no hetero atoms, (4) aliphatic groups containing both cyclic and acyclic portions, said aliphatic groups being saturated, unsubstituted, and containing no hetero atoms, (5) linear ethylenically unsaturated unsubstituted aliphatic groups containing no hetero atoms, (6) branched ethylenically unsaturated unsubstituted aliphatic groups containing no hetero atoms, (7) cyclic ethylenically unsaturated unsubstituted aliphatic groups containing no hetero atoms, (8) aliphatic groups containing both cyclic and acyclic portions, said aliphatic groups being ethylenically unsaturated, unsubstituted, and containing no hetero atoms, (9) linear saturated substituted aliphatic groups containing no hetero atoms, (10) branched saturated substituted aliphatic groups containing no hetero atoms, (11) cyclic saturated substituted aliphatic groups containing no hetero atoms, (12) aliphatic groups containing both cyclic and acyclic portions, said aliphatic groups being saturated, substituted, and containing no hetero atoms, (13) linear ethylenically unsaturated substituted aliphatic groups containing no hetero atoms, (14) branched ethylenically unsaturated substituted aliphatic groups containing no hetero atoms, (15) cyclic ethylenically unsaturated substituted aliphatic groups containing no hetero atoms, (16) aliphatic groups containing both cyclic and acyclic portions, said aliphatic groups being ethylenically unsaturated, substituted, and contain no hetero atoms, (17) linear saturated unsubstituted aliphatic groups containing hetero atoms, (18) branched saturated unsubstituted aliphatic groups containing hetero atoms, (19) cyclic saturated unsubstituted aliphatic groups containing hetero atoms, (20) aliphatic groups containing both cyclic and acyclic portions, said aliphatic groups being saturated, unsubstituted, and containing hetero atoms, (21) linear ethylenically unsaturated unsubstituted aliphatic groups containing hetero atoms, (22) branched ethylenically unsaturated unsubstituted aliphatic groups containing hetero atoms, (23) cyclic ethylenically unsaturated unsubstituted aliphatic groups containing hetero atoms, (24) aliphatic groups containing both cyclic and acyclic portions, said aliphatic groups being ethylenically unsaturated, unsubstituted, and containing hetero atoms, (25) linear saturated substituted aliphatic groups containing hetero atoms, (26) branched saturated substituted aliphatic groups containing hetero atoms, (27) cyclic saturated substituted aliphatic groups containing hetero atoms, (28) aliphatic groups containing both cyclic and acyclic portions, said aliphatic groups being saturated, substituted, and containing hetero atoms, (29) linear ethylenically unsaturated substituted aliphatic groups containing hetero atoms, (30) branched ethylenically unsaturated substituted aliphatic groups containing hetero atoms, (31) cyclic ethylenically unsaturated substituted aliphatic groups containing hetero atoms, and (32) aliphatic groups containing both cyclic and acyclic portions, said aliphatic groups being ethylenically unsaturated, substituted, and containing hetero atoms, (ii) an aryl group (including substituted and unsubstituted aryl groups, and wherein hetero atoms, such as oxygen, nitrogen, sulfur, silicon, phosphorus, boron, and the like either may or may not be present in the aryl group), in one embodiment with at least about 5 carbon atoms, and in another embodiment with at least about 6 carbon atoms, and in one embodiment with no more than about 18 carbon atoms, in another embodiment with no more than about 12 carbon atoms, and in yet another embodiment with no more than about 6 carbon atoms, although the number of carbon atoms can be outside of these ranges, (iii) an arylalkyl group (including substituted and unsubstituted arylalkyl groups, and wherein hetero atoms, such as oxygen, nitrogen, sulfur, silicon, phosphorus, boron, and the like either may or may not be present in either the aryl or the alkyl portion of the arylalkyl group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as benzyl or the like, or (iv) an alkylaryl group (including substituted and unsubstituted alkylaryl groups, and wherein hetero atoms, such as oxygen, nitrogen, sulfur, silicon, phosphorus, boron, and the like either may or may not be present in either the aryl or the alkyl portion of the alkylaryl group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges.

Phase change inks exhibiting gelling behavior have been described in, for example, U.S. Pat. Nos. 6,906,118, 6,761,758, 6,811,595, 6,860,928, and 6,872,243, the disclosures of each of which are totally incorporated herein by reference.

A polyalkylene wax, such as a polyethylene wax, a polypropylene wax, or mixtures thereof, may optionally be included in the ink carrier. The polyalkylene wax(es) is present in the ink carrier in any desired or effective amount, in one embodiment of at least about 5 percent by weight of the ink carrier, in another embodiment of at least about 10 percent by weight of the ink carrier, and in yet another embodiment of at least about 15 percent by weight of the ink carrier, and in one embodiment equal to or less than about 50 percent by weight of the ink carrier, in another embodiment equal to or less than about 40 percent by weight of the ink carrier, and in yet another embodiment equal to or less than about 30 percent by weight of the ink carrier, although the amount can be outside of these ranges. Examples of suitable polyalkylene waxes include POLYWAX® 500 (commercially available from Baker Petrolite) and distilled POLYWAX® 500, preferably having a viscosity at the jetting temperature of about 110 degree C. of about 10% to about 100% higher than the viscosity of the undistilled POLYWAX® 500, POLYWAX® 400 and distilled POLYWAX® 400 from Baker Petrolite, Vybar 103 and 253 also commercially available from Baker Petrolite, POLYWAX® 655 and higher molecular weight polywax materials are also suitable. The molecular weight of the POLYWAX® material in one embodiment is in the range of from about 350 to equal to or less than about 600 g/mole.

The ink carrier can be present in the phase change ink prepared in one embodiment in an amount of at least about 50% by weight of the ink, in another embodiment of at least about 85% by weight of the ink, and in yet another embodiment of at least about 90% by weight of the ink, and in one embodiment equal to or less than about 99% by weight of the ink, in another embodiment equal to or less than about 98% by weight of the ink, and in yet another embodiment equal to or less than about 95% by weight of the ink, although the amount can be outside of these ranges.

The phase change ink compositions also contain a colorant. Any desired or effective colorant can be employed, including dyes, pigments, mixtures thereof, and the like, provided that the colorant can be dissolved or dispersed in the ink vehicle. The phase change carrier compositions can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Ciba-Geigy); Direct Brilliant Pink B (Crompton & Knowles); Aizen Spilon Red C-BH (Hodogaya Chemical); Kayanol Red 3BL (Nippon Kayaku); Levanol Brilliant Red 3BW (Mobay Chemical); Levaderm Lemon Yellow (Mobay Chemical); Spirit Fast Yellow 3G; Aizen Spilon Yellow C-GNH (Hodogaya Chemical); Sirius Supra Yellow GD 167; Cartasol Brilliant Yellow 4GF (Sandoz); Pergasol Yellow CGP (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc. A (Morton-Thiokol); Diaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 26050] (BASF), Intratherm Yellow 346 commercially available from Crompton and Knowles, C.I. Disperse Yellow 238, Neptune Red Base NB543 (BASF, C.I. Solvent Red 49), Neopen Blue FF-4012 commercially available from BASF, Lampronol Black BR commercially available from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are totally incorporated herein by reference, and commercially available from, for example, Milliken & Company as Milliken Ink Yellow 12, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Pigments are also suitable colorants for the phase change inks. Examples of suitable pigments include Violet Toner VT-8015 (Paul Uhlich); Paliogen Violet 5100 (BASF); Paliogen Violet 5890 (BASF); Permanent Violet VT 2645 (Paul Uhlich); Heliogen Green L8730 (BASF); Argyle Green XP-111-S (Paul Uhlich); Brilliant Green Toner GR 0991 (Paul Uhlich); Lithol Scarlet D3700 (BASF); Toluidine Red (Aldrich); Scarlet for Thermoplast NSD PS PA (Ugine Kuhlmann of Canada); E.D. Toluidine Red (Aldrich); Lithol Rubine Toner (Paul Uhlich); Lithol Scarlet 4440 (BASF); Bon Red C (Dominion Color Company); Royal Brilliant Red RD-8192 (Paul Uhlich); Oracet Pink RF (Ciba-Geigy); Paliogen Red 3871K (BASF); Paliogen Red 3340 (BASF); Lithol Fast Scarlet L4300 (BASF); Heliogen Blue L6900, L7020 (BASF); Heliogen Blue K6902, K6910 (BASF); Heliogen Blue D6840, D7080 (BASF); Sudan Blue OS (BASF); Neopen Blue FF4012 (BASF); PV Fast Blue B2G01 (American Hoechst); Irgalite Blue BCA (Ciba-Geigy); Paliogen Blue 6470 (BASF); Sudan III (Red Orange) (Matheson, Colemen Bell); Sudan II (Orange) (Matheson, Colemen Bell); Sudan Orange G (Aldrich), Sudan Orange 220 (BASF); Paliogen Orange 3040 (BASF); Ortho Orange OR 2673 (Paul Uhlich); Paliogen Yellow 152, 1560 (BASF); Lithol Fast Yellow 0991K (BASF); Paliotol Yellow 1840 (BASF); Novoperm Yellow FGL (Hoechst); Permanent Yellow YE 0305 (Paul Uhlich); Lumogen Yellow D0790 (BASF); Suco-Yellow L1250 (BASF); Suco-Yellow D1355 (BASF); Suco Fast Yellow D1355, D1351 (BASF); Hostaperm Pink E (American Hoechst); Fanal Pink D4830 (BASF); Cinquasia Magenta (Du Pont); Paliogen Black L0084 (BASF); Pigment Black K801 (BASF); and carbon blacks such as Regal 330® (Cabot), Carbon Black 5250, Carbon Black 5750 (Columbia Chemical), and the like.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, Copending Application U.S. Ser. No. 10/260,146, filed Sep. 27, 2002, entitled "Colorant Compounds," and Copending application U.S. Ser. No. 10/260,379, filed Sep. 27, 2002, entitled "Methods for Making Colorant Compounds," the disclosures of each of which are totally incorporated herein by reference.

Other ink colors besides the subtractive primary colors can be desirable for applications such as postal marking, industrial marking, and labeling using phase change printing, and the inks are applicable to these needs. Further, infrared (IR) or ultraviolet (UV) absorbing dyes can also be incorporated into the inks for use in applications such as "invisible" coding or marking of products. Examples of such infrared and ultraviolet absorbing dyes are disclosed in, for example, U.S. Pat. No. 5,378,574, U.S. Pat. No. 5,146,087, U.S. Pat. No. 5,145,518, U.S. Pat. No. 5,543,177, U.S. Pat. No. 5,225,900, U.S. Pat. No. 5,301,044, U.S. Pat. No. 5,286,286, U.S. Pat. No. 5,275,647, U.S. Pat. No. 5,208,630, U.S. Pat. No. 5,202,265, U.S. Pat. No. 5,271,764, U.S. Pat. No. 5,256,193, U.S. Pat. No. 5,385,803, and U.S. Pat. No. 5,554,480, the disclosures of each of which are totally incorporated herein by reference.

In a specific embodiment, the colorant is an isocyanate-derived colored resin as disclosed in, for example, U.S. Pat. No. 5,780,528 and U.S. Pat. No. 5,919,839, the disclosures of each of which are totally incorporated herein by reference. In this embodiment, the colorant is the reaction product of a hydroxyl-substituted or primary or secondary amino-substituted chromophore with an isocyanate. Examples of suitable isocyanates include monoisocyanates, diisocyanates, triisocyanates, copolymers of a diisocyanate, copolymers of a triisocyanate, polyisocyanates (having more than three isocyanate functional groups), and the like, as well as mixtures thereof. Specific examples of suitable isocyanates include those listed hereinabove as being suitable for reaction with the hydroxyl-substituted or amino-substituted antioxidant. Examples of suitable hydroxyl-substituted and primary or secondary amino-substituted chromophores include those disclosed in, for example, U.S. Pat. No. 3,157,633, U.S. Pat. No. 3,927,044, U.S. Pat. No. 3,994,835, U.S. Pat. No. 4,102,644, U.S. Pat. No. 4,113,721, U.S. Pat. No. 4,132,840, U.S. Pat. No. 4,137,243, U.S. Pat. No. 4,170,564, U.S. Pat. No. 4,284,729, U.S. Pat. No. 4,507,407, U.S. Pat. No. 4,640,690, U.S. Pat. No. 4,732,570, U.S. Pat. No. 4,751,254, U.S. Pat. No. 4,751,254, U.S. Pat. No. 4,761,502, U.S. Pat. No. 4,775,748, U.S. Pat. No. 4,812,141, U.S. Pat. No. 4,846,846, U.S. Pat. No. 4,871,371, U.S. Pat. No. 4,912,203, U.S. Pat. No. 4,978,362, U.S. Pat. No. 5,043,013, U.S. Pat. No. 5,059,244, U.S. Pat. No. 5,149,800, U.S. Pat. No. 5,177,200, U.S. Pat. No. 5,270,363, U.S. Pat. No. 5,290,921, and U.S. Pat. No. 5,731,398, the disclosures of each of which are totally incorporated herein by reference. Hydroxyl-containing and primary or secondary amino-containing colorants from the classes of Color Index (C.I.) Solvent Dyes, Disperse Dyes, modified Acid and Direct Dyes, Basic Dyes, Sulphur Dyes, Vat Dyes, and the like can also be used. These colorants can also affect the rheological properties of the inks containing them.

Functional wax(es) can also be included in the ink carrier such as those described in Copending application U.S. Ser. No. (not yet assigned; Xerox Ref No. 20040313-US-NP), filed concurrently herewith, entitled "Ink Carriers, Phase Change Inks Including Same and Methods for Making Same," with the named inventors Marcel P. Breton, Adela Goredema, Christine E. Bedford, Christopher Wagner, Stephan Drappel Caroline Turek, Raymond W. Wong and Nadia Edun, the disclosure of which is totally incorporated herein by reference. In an embodiment herein the functional wax can be an alcohol wax, or a blend thereof. In an embodiment, the blend of alcohol waxes can be a blend of mono- di-, tri- or tetra-alcohol waxes. The alcohol wax(es) can be present in the ink carrier in any desired or effective amount, in one embodiment of at least about 20 percent by weight of the ink carrier, in another embodiment of at least about 25 percent by weight of the ink carrier, and in yet another embodiment of at least about 30 percent by weight of the ink carrier, and in one embodiment of equal to or less than about 65 percent by weight of the ink carrier, in another embodiment of equal to or less than about 55 percent by weight of the ink carrier, and in yet another embodiment of equal to or less than about 45 percent by weight of the ink carrier, although the amount can be outside of these ranges.

The ink carrier may contain a branched triamide such as those described in U.S. Pat. No. 6,860,930, the disclosure of which is totally incorporated herein by reference. When the triamide or a mixture of triamide with other polyamides is present in combination with other materials to make up the ink carrier, the polyamide component is present in any desired or effective amount, in one embodiment at least about 5 percent by weight of the carrier, in another embodiment at least about 15 percent by weight of the carrier, and in yet another embodiment at least about 25 percent by weight of the carrier, and in one embodiment equal to or less than about 90 percent by weight of the carrier, in another embodiment equal to or less than about 80 percent by weight of the carrier, and in yet another embodiment equal to or less than about 70 percent by weight of the carrier, although the amount of triamide or polyamide mixture can be outside of these ranges.

Additional suitable phase change ink carrier materials can include paraffins, microcrystalline waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. In an embodiment of this disclosure, one or more of these materials can also be employed in a mixture with a fatty amide material and/or an isocyanate-derived material.

The ink disclosed herein can also contain, resins and waxes such as: Crodamide 203 (commercially available from Croda), Crodamide ORX (commercially available from Croda), Kemamide S-180 and E-180 (commercially available from Witco), Unislip 1750 (commercially available from Uniqema), Uniclear 80 (commercially available from Arizona), a dicapryladipate compatibilizer such as Arizona SP-100, Vybar 263 and 243 (commercially available from Baker Petrolite), 1-docosanol (commercially available from Aldrich), Unilin 700 (commercially available from Baker Hughes), Beeswax Cerra Bellina (commercially available from Koster Keunen), branched BK-42 ester (commercially available from Koster Keunen), Kester Wax K82-D, hdroxypolyester K-82-P, synthetic Karnauba K-82-H, Siliconyl Beeswax (commercially available from Koster Keunen), stearyl alcohol 98 NF (commercially available from Koster Keunen), Kraton D1101 (commercially available from Kraton Polymers), synthetic paraffin wax of sharp melting point such as Callista 158 (commercially available from Shell), microcrystalline branched hydrocarbon waxes such as Microwax HG (commercially available from Paramelt), Mp=80-86 and Microwax P827, Kemamide S-221, polyethyleneglycol 400 distearate available (commercially available from Mosselman); paraffin waxes such as HNP-9 and HNP-12 (commercially available from Nippon Seiro Co.); semicrystalline wax such as HIMIC-2065 (commercially available from Nippon Seiro Co.); hydrogenated styrene-butadiene copolymers of low molecular weight such as Tuftec H1141.11102 (commercially available from Asahi Kasei Corp); Ethylene-Propylene copolymers such as EP-700 and EP-602 (commercially available from Baker Hughes); Unithox 420 ethoxylate (commercially available from Baker Hughes); propylene-ethylene copolymer alcohols of melting point in the range of 65 to 100 C (commercially available from Baker Hughes); maleic anhydride mono-isopropyl maleate such as Ceramer 1251 (commercially available from Baker Hughes); alpha olefin-maleic anhydride polymer of melting point of about 80 degree C. (commercially available from Baker Hughes) (X-5399); oxidized ethene homopolymer, Petrolite C-9500 (commercially available from Baker Hughes); oxidized 1-propene with ethane, Cardis 314, (commercially available from Baker Hughes), Victory Amber wax (commercially available from Bareco), oxidized PE such as OX-020T (commercially available from Nippon Seiro Co.);

paraffin wax is a straight chain hydrocarbon having a melting point of about 49 to 71 degree C.; microcrystalline wax is separated from asphalts and is higher in MW and more branched than the paraffin wax. Melting point is between 60 and 89 degree C. HNP-3,5,9,10,11 and HNP-12 (commercially available from Nippon Seiro Co.).

The ink compositions disclosed herein in one embodiment have melting points of no higher than about 105° C., in another embodiment of no higher than about 100° C., in yet another embodiment of no higher than about 95° C., and in still another embodiment of no higher than about 90° C., although the melting point can be outside of these ranges.

The ink compositions prepared by the process disclosed herein generally have melt viscosities, at the jetting temperature in one embodiment is equal to or less than about 125° C., in another embodiment is equal to or less than about 120° C., and in a further embodiment is equal to or less than about 115° C., in still a further embodiment is equal to or less than about 110° C., and in still another embodiment is equal to or less than about 105° C., although the jetting temperature can be outside of these ranges, which in one embodiment is equal to or greater about 30 centipoise, in another embodiment is equal to or less than about 25 centipoise, and in another embodiment is equal to or less than about 20 centipoise, and in another embodiment no less than about 2 centipoise, in another embodiment no less than about 3 centipoise, and in another embodiment no less than about 5 centipoise, although the melt viscosity can be outside of these ranges.

The inks disclosed herein can be employed in apparatus for direct printing ink jet processes and in indirect (offset) printing ink jet applications. Another embodiment is directed to a process which comprises incorporating an ink as disclosed herein into an ink jet printing apparatus, melting the ink, and causing droplets of the melted ink to be ejected in an image wise pattern onto a recording substrate. A direct printing process is also disclosed in, for example, U.S. Pat. No. 5,195,430, the disclosure of which is totally incorporated herein by reference. The inks prepared as disclosed herein can be employed in apparatus for indirect (offset) printing ink jet applications. Another embodiment is directed to a process which comprises incorporating an ink prepared as disclosed herein into an ink jet printing apparatus, melting the ink, causing droplets of the melted ink to be ejected in an image wise pattern onto an intermediate transfer member, and transferring the ink in the image wise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in image wise pattern by oscillations of piezoelectric vibrating elements.

The temperature of the phase change ink within the ink jet printer when idling prior to the melted ink being ejected in an image wise pattern is the stand-by temperature. The stand-by temperature is in one embodiment no higher than about 110° C., in another embodiment no higher than about 105° C., in another embodiment no higher than about 100° C., in another embodiment no higher than about 95° C., and in another embodiment no higher than about 90° C., although the stand-by temperature can be outside of these ranges.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, Hammermill Laserprint Paper, and the like, transparency materials, fabrics, textile products, plastics, polymeric films, inorganic substrates such as metals and wood, and the like Specific embodiments will now be described in detail. These examples are intended to be illustrative, and the claims are not limited to the materials, conditions, or process parameters set forth in these embodiments.

EXAMPLE I

Didodecylurea was prepared as follows: Dodecylamine (37 mmol, 6.84 g, commercially available from Sigma Aldrich Fine Chemicals, Milwaukee, Wis.) was dissolved in hexane (100 ml) in a 250 ml single neck, round bottomed flask. A solution of dodecyl isocyanate (37 mmol, 7.8 g, commercially available from Sigma Aldrich Fine Chemicals) in hexane (100 ml) was slowly added to the amine solution through an addition funnel. The mixture was stirred for 1 hr during which a white precipitate was formed. IR was used to confirm completion of reaction. The white precipitate was filtered and dried under vacuum overnight to give 14.64 g of a white solid (99.7% yield). The product is believed to be of the formula

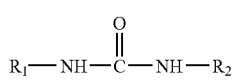

wherein $R_1$ and $R_2$ are both $CH_3(CH)_{11}$. The product had a melting point of 107.7, complex viscosity of 16.4 cps at 120° C. and was shown to be pure by proton NMR. $^1$H NMR (DMSO-$d_6$ at 100° C.); 0.85 ppm (triplet, 6H integration. C$\underline{H}_3$(CH$_2$)$_{11}$NH—), 1.1-1.45 (multiplet, 40 H integration, CH$_3$(C$\underline{H}_2$)$_{10}$CH$_2$—NH—), 2.95 (quartet, 4H integration, CH$_3$(CH$_2$)$_{10}$C$\underline{H}_2$—NH—)

EXAMPLE II

EXAMPLE II was prepared using the same procedure described in EXAMPLE I except that octadecylamine(commercially available from Sigma Aldrich Fine Chemicals) was used in the reaction. The product is believed to be of the formula

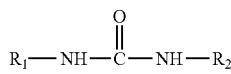

wherein $R_1$=$CH_3(CH_2)_{17}$ and $R_2$=$CH_3(CH_2)_{11}$. The product had a melting point of 101° C.

EXAMPLE III

EXAMPLE III was prepared using the same procedure described in EXAMPLE I except that cyclohexyl amine and octadecylisocyanate (both available from Sigma Aldrich Fine Chemicals) were used in the reaction. The product is believed to be of the formula

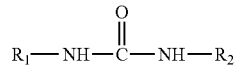

wherein $R_1$ is

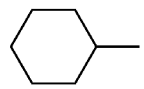

and $R_2$=$CH_3(CH_2)_{17}$. The product had a melting point of 108° C.

EXAMPLE IV

EXAMPLE IV was prepared using the same procedure described in EXAMPLE I except that octadecylamine and octadecylisocyanate were used in the reaction. The product is believed to be of the formula

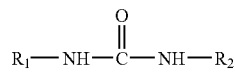

wherein $R_1$ and $R_2$ are both $CH_3(CH_2)_{17}$. The product had a melting point of 117° C. and a complex viscosity of 45.0 cps at 120° C.

EXAMPLE V

EXAMPLE V was prepared using the same procedure described in EXAMPLE I except that an ether amine with the following structure $CH_3(CH_2)_x$—O—$(CH_2)_3$—$NH_2$ (where x=15-17, available from Tomah Chemical, Milton, Wis.)) and octadecylisocyanate were used. The product is believed to be of the formula

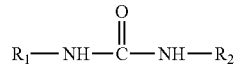

wherein $R_1$=$CH_3(CH_2)_x$—$O(CH_2)_3$ (where x=15-17) and $R_2$=$CH_2)_{17}$. The product had a melting point of 105° C.

INK EXAMPLE 1

An ink was prepared in a 50 ml beaker by adding (1) 18.0 grams (90 wt %) of behenyl behenate (Kester Wax 72, obtained from Kester Keunen, Watertown, Conn.) and (2) 2.0 grams (10 wt %) of didodecylurea prepared in Example 1 above. The materials were melted together at a temperature of about 135° C. in a reaction block (from H+P Labortechnik GmbH, München) controlled with a Telemodel 40CT, stirred for 2 hours at 500 rpm, and then cooled to room temperature.

The ink thus prepared exhibited a viscosity of 5.64 centipoise as measured by an RFS3 Rheometrics parallel-plate viscometer at 110° C.

INK EXAMPLE 2

An ink was prepared as described in Ink Example 1 above except that Polywax 500, obtained from Baker Petrolite, Tulsa, Okla., a polyethylene homopolymer with an average chain length of C-36, was also added. Relative amounts of the ingredients in this ink, expressed in wt % of the ink, are indicated in Table 1. The ink thus prepared exhibited a viscosity of 5.56 centipoise as measured by an RFS3 Rheometrics parallel-plate viscometer at 110° C.

INK EXAMPLE 3

A cyan ink was prepared as described in Ink Example 1 above except that Polywax 500 and cyan colorant disclosed in Example VIII of U.S. Pat. No. 6,472,523, the disclosure of which is totally incorporated herein by reference, were also added. Relative amounts of the ingredients in this ink, expressed in wt % of the ink, are indicated in Table 1 below. The ink thus prepared exhibited a viscosity of 6.07 centipoise as measured by an RFS3 Rheometrics parallel-plate viscometer at 110° C.

INK EXAMPLE 4

A cyan ink was prepared in a 150 ml beaker by adding (1) 86.10 grams (71.75 wt %) of Kester Wax 72, (2) 24.00 grams (20 wt %) of Polywax 500, (3) 6.00 grams (5 wt %) of the didodecylurea from Example I above and (4) 0.30 grams (0.25 wt %) of NAUGUARD® 445 antioxidant (obtained from Uniroyal Chemical Co., Middlebury, Conn.). The materials were melted together at a temperature of about 135° C. in a reaction block (from H +P Labortechnik GmbH, München) controlled with a Telemodel 40CT, and stirred for about 2 hours at about 500 rpm. To this mixture was added (5) 3.60 gram (3.0 wt %) of the cyan colorant disclosed in Example VIII of U.S. Pat. No. 6,472,523. The ink was stirred for 2 additional hours. The ink thus prepared was filtered through a heated MOTT® apparatus (obtained from Mott Mettallurgical) using a NAE 0.2 micron filter under a pressure of about 15 pounds per square inch. The filtered cyan ink was poured in an aluminum mould and allowed to solidify. The cyan ink thus prepared exhibited a viscosity of 5.7 centipoise as measured by an RFS3 Rheometrics parallel-plate viscometer at 110° C.

INK EXAMPLE 5

An ink was prepared as described in Ink Example 4 except 10 wt % of the didodecylurea was used. Relative amounts of the ingredients in this ink, expressed in wt % of the ink, are indicated in Table 1 below. The ink thus prepared exhibited a viscosity of 7.75 centipoise as measured by an RFS3 Rheometrics parallel-plate viscometer at 110° C.

INK EXAMPLE 6

An ink was prepared as described in Ink Example 4 except 30 wt % of the didodecylurea was used. Relative amounts of the ingredients in this ink, expressed in wt % of the ink, are indicated in Table 1 below. The ink thus prepared exhibited a viscosity of 8.45 centipoise as measured by an RFS3 Rheometrics parallel-plate viscometer at 110° C.

TABLE 1

Ink Formulations with Kester wax and urea gellant

| Components (wt %) | Ink 1 | Ink 2 | Ink 3 | Ink 4 | Ink 5 | Ink 6 |
|---|---|---|---|---|---|---|
| Kester wax 72 | 90 | 70 | 67 | 71.75 | 66.75 | 46.75 |
| Polywax 500 | 0 | 20 | 20 | 20 | 20 | 20 |
| Didoceylurea (Example 1) | 10 | 10 | 10 | 5 | 10 | 30 |
| NAUGUARD ® 445 | 0 | 0 | 0 | 0.25 | 0.25 | 0.25 |
| Blue Mustang dye | 0 | 0 | 3 | 3 | 3 | 3 |
| Total | 100 | 100 | 100 | 100 | 100 | 100 |
| Viscosity at 110° C. (cps) | 5.64 | 5.56 | 6.07 | 5.7 | 7.75 | 8.45 |

The rheology of the inks was measured using a controlled strain rheometer, RFS3 obtained from Rheometrics Scientific, in a conventional parallel plate configuration. Table 2 below shows the tan-delta (ratio of loss modulus or viscous modulus, G", to storage modulus or elastic modulus, G') of inks 1, 2 and 3, in a region above their melting point (melting point of the inks are 75-80° C. as determined by the rheometer). Inks 1, 2 and 3 exhibited a tan-delta of less than 1.0 in this region indicating that G' is much higher than G", which in turn suggests that the material is elastic in this region, and is therefore determined to be the gel state. Kester wax 72 without any gellant has a high tan-delta in the same region, suggesting that it exhibits a very low elasticity as compared to Inks 1, 2 and 3. This data demonstrate that the didodecylurea significantly affects the rheological properties of the solid inks containing them. The increase of elasticity of the ink above its melting point is expected to translate into a more robust image.

TABLE 2

Ink Rheological Properties

| Temperature (° C.) | Ink 1 tan-delta | Ink 2 tan-delta | Ink 3 tan-delta | Kester Wax 72 tan-delta |
|---|---|---|---|---|
| 90 | 0.33 | 0.32 | 0.5 | 78.1 |
| 85 | 0.31 | 0.38 | 0.56 | 8.54 |
| 80 | 0.311 | 0.35 | 0.47 | 2.17 |

Inks 4, 5 and 6 were printed on papers using a Phaser 860 Printer, modified to operate at the temperatures indicated below, which uses an indirect printing process producing images having excellent print quality and robustness. These inks could be jetted at low temperatures. These temperatures were 94° C., 93° C. and 109° C. for inks 4, 5 and 6, respectively.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A low energy phase change ink composition comprising (1) an ink carrier comprising (A) a first component which comprises a monoester wax having at least one alkyl group comprising at least 10 carbon atoms, (B) a second component which comprises a polyalkylene wax, (2) a didodecylurea gellant and (3) a colorant.

2. An ink according to claim 1, wherein the ink carrier also includes (C) a third component which comprises a branched triamide.

3. An ink according to claim 1, wherein the monoester wax is a low melting monoester wax having a melting point of at least about 60° C. and equal to or less than about 90° C.

4. An ink according to claim 1, wherein the monoester wax is of the formula

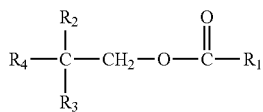

wherein $R_1$ and $R_2$ each, independently of the other, is an alkyl group having at least 10 carbon atoms, and $R_3$ and $R_4$ each, independently of the other, are H, OH, or alkyl.

5. An ink according to claim 4, wherein $R_1=CH_3(CH_2)_{16}$, $CH_3(CH_2)_{17}$, $CH_3(CH_2)_{20}$, or $CH_3(CH_2)_{24}$, $R_2=CH_3(CH_2)_{14}$, $CH_3(CH_2)_{16}$, $CH_3(CH_2)_{17}$, or $CH_3(CH_2)_{20}$, $R_3=H$, $CH_3(CH_2)_{15}$ or an alkyl group having 18 to 38 carbon atoms, and $R_4$ is H or OH.

6. An ink according to claim 1, wherein the viscosity of the monoester wax at the jetting temperature is equal to or less than about 10 cps.

7. An ink according to claim 1, wherein the viscosity of the didodecylurea gellant at the jetting temperature is equal to or less than about $1 \times 10^6$ cps.

8. A method for producing a phase change ink composition comprising forming an ink carrier comprising a first component which comprises a monoester wax having at least one alkyl group comprising at least 10 carbon atoms, a second component which comprises a polyalkylene wax, and a didodecylurea gellant, and combining a colorant with said first and second component to produce said phase change ink composition.

9. An method according to claim 8, wherein ink carrier can also include (C) a third component which comprises a branched triamide.

10. An method according to claim 8, wherein the monoester wax is a low melting monoester wax having a melting point of at least about 60° C. and equal to or less than about 90° C.

11. A method according to claim 8, wherein the monoester wax is of the formula

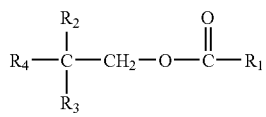

wherein $R_1$ and $R_2$ each, independently of the other, is an alkyl group having at least 10 carbon atoms, and $R_3$ and $R_4$ are H, OH, or alkyl.

12. A method according to claim 11, wherein $R_1=CH_3(CH_2)_{16}$, $CH_3(CH_2)_{17}$, $CH_3(CH_2)_{20}$, or $CH_3(CH_2)_{24}$, $R_2=CH3(CH_2)_{14}$, $CH_3(CH_2)_{16}$, $CH_3(CH_2)_{17}$, or $CH_3(CH_2)_{20}$, $R_3=H$, $CH_3(CH_2)_{15}$ or an alkyl group having 18 to 38 carbon atoms, and $R_4$ is H or OH.

13. A method according to claim 8, wherein the viscosity of the monoester wax at the jetting temperature is equal to or less than about 10 cps.

14. A low energy phase change ink composition comprising (1) an ink carrier comprising (A) a first component which comprises a monoester wax having at least one alkyl group comprising at least 10 carbon atoms, (B) a second component which comprises a polyalkylene wax, (C) a third component which comprises a branched triamide, (2) a didodecylurea gellant, and (3) a colorant.

15. An ink according to claim 1, which has a tan-delta equal to or less than 1.0.

16. An ink according to claim 2, which has a tan-delta equal to or less than 1.0.

17. A method according to claim 8, wherein the ink has a tan-delta equal to or less than 1.0.

18. A method according to claim 9, wherein the ink has a tan-delta equal to or less than 1.0.

19. An ink according to claim 14, which has a tan-delta equal to or less than 1.0.

* * * * *